Sept. 24, 1957    C. H. BLACK    2,807,081
BEARING BUSHING PRESSES
Filed Aug. 2, 1954
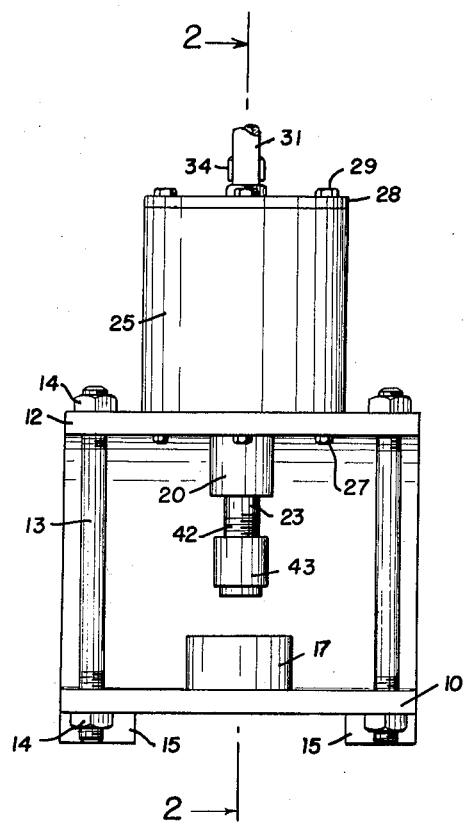
Fig. 1
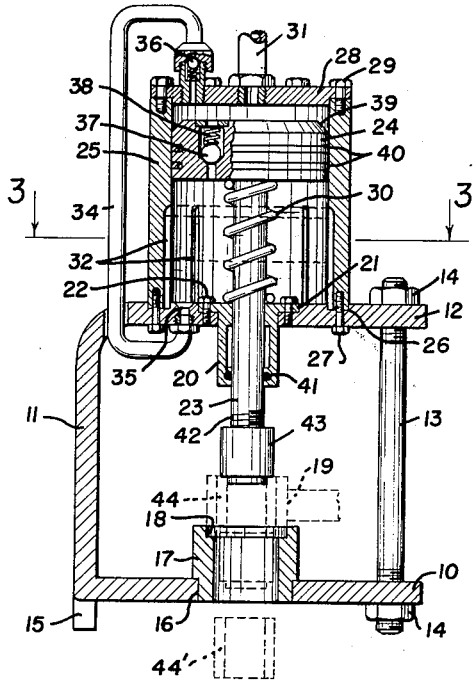
Fig. 2
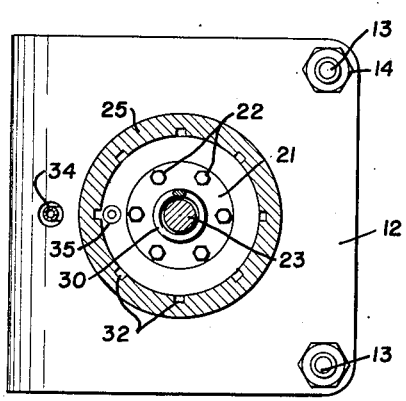
Fig. 3
INVENTOR.
Cloyd H. Black
BY
ATTORNEY

# United States Patent Office 2,807,081
Patented Sept. 24, 1957

2,807,081

BEARING BUSHING PRESSES

Cloyd H. Black, Denver, Colo.

Application August 2, 1954, Serial No. 447,333

2 Claims. (Cl. 29—252)

This invention relates to a press, and more particularly to a compressed air operated press designed for pressing bushings from or into engine parts such as connecting rods and the like as used on automotive engines, and has for its principal object the provision of a portable bench-type press which will operate rapidly and efficiently to remove or replace bearing bushings without damage to the bushing or bearing.

Another object of the invention is to so construct the device that it can be readily adapted to bearings and bushings of various sizes.

A further object is to provide a pressure-actuated bushing press having a pressure plunger in which the downward movement of the plunger will be automatically stopped before the extreme of movement is reached so as to prevent damage to the press.

A still further object is to provide a bushing press with a pressure cylinder and piston with means for returning lubricating oil passing the piston to the upper extremity of the cylinder to prevent loss of oil and to prevent the accumulation of oil below the piston to the detriment of efficient press operation.

Other objects and advantages reside in the detail construction of the invention, which is designed for simplicity, economy and efficiency. These will become more apparent from the following description.

In the following detailed description of the invention, reference is had to the accompanying drawing which forms a part thereof. Like numerals refer to like parts in all views of the drawing and throughout the description.

In the drawing:

Fig. 1 is a front view of the improved bearing press;

Fig. 2 is a vertical section therethrough, taken on the line 2—2, Fig. 1; and

Fig. 3 is a horizontal section, looking downwardly on the line 3—3, Fig. 2.

The improved bushing press comprises a base plate 10 from the rear edge of which a vertical backing plate 11 arises. The upper extremity of the backing plate is turned forwardly parallel to the base plate 10 to form a top plate 12. The forward extremity of the top plate 12 is prevented from swinging upwardly by means of two tie bolts 13 provided with terminal nuts 14. The tie bolts extend between the two plates 10 and 12 adjacent the forward corners thereof. The base plate 10 is supported on the lower extremities of the tie bolts 13 and upon foot members 15 secured to and extending downwardly from the rear extremity of the base plate 10.

The base plate 10 is provided with a medial aperture 16 for receiving any desired one of a plurality of tubular anvil members 17, each of which has an upper internal annular shoulder 18 for receiving the bearing of a connecting rod, such as indicated in broken line at 19, or other device. The top plate 12 is also provided with a medial aperture in vertical, axial alignment with the aperture 16 for receiving a tubular plunger guide 20.

The plunger guide 20 is provided with an upper flange 21 which rests in a counterbore about the upper aperture and which is secured therein by means of suitable cap screws 22. A vertical plunger 23 extends upwardly through the plunger guide 20 and terminates in a piston 24 adapted to vertically reciprocate in a pressure cylinder 25.

The pressure cylinder 25 is seated in an annular recess 26 formed in the top plate 12 in which it is secured by means of suitable cap screws 27. The upper extremity of the pressure cylinder 25 is closed by means of a cylinder head 28 secured thereon by means of cap screws 29.

A compression spring 30 constantly urges the piston 24 upwardly to exhaust the air from the upper portion of the cylinder 25 to the atmosphere through an air pipe 31. The piston may be forced downwardly by admitting compressed air to the air pipe 31 from any suitable pressure source. The admission of air to the pipe 31 and the discharge of air therefrom to the atmosphere is controlled by any suitable valving arrangement, not shown. A plurality of vertical, spaced-apart by-pass grooves 32 are formed in the internal wall of the cylinder 25 and extend upwardly from the lower extremity of the cylinder a distance slightly in excess of the thickness of the piston 24.

Thus, it can be seen that when the piston 24 is forced downwardly by air pressure entering through the air pipe 31, it will move downwardly until the upper extremity of the piston travels below the upper extremities of the grooves 32. When this point is reached, the air under pressure will flow past the piston through the grooves 32 to equalize the pressure above and below the piston so that the latter will be resiliently brought to rest, thus preventing the piston 24 from striking the top plate 12. Release of pressure in the pressure pipe 31 allows the spring 30 to force the piston 24 upwardly in the cylinder.

It will be noted that the instant the pressure above the piston 24 is relieved, the piston will move upwardly to close off the by-pass grooves 32, thus retaining air under pressure below the piston while the pressure on the air above the piston is completely relieved to the atmosphere. This excess pressure below the piston assists the spring 30 in forcing the piston upwardly. A portion of this excess pressure, however, is relieved through a return pipe 34 to the space above the piston 24. The return pipe 34 extends from a funnel-shaped return port 35 in the top plate 12 to a check valve 36 mounted in the cylinder head 28.

The return pipe 34 serves a double purpose: First, it acts to relieve the pressure in the lower portion of the cylinder, and, second, it acts to return any lubricating oil which might by-pass the piston 24 to the top of the cylinder for re-lubrication purposes and to prevent accumulation in the lower portion of the cylinder. It can be seen that oil reaching the bottom of the cylinder will flow into the funnel-shaped return port 35 and be blown by the returning air past the check valve 36 to the top of the cylinder.

To still further assist in relieving pressure below the piston 24 when the air pipe is open to the atmosphere, a by-pass passage is formed through the piston. A second check valve ball 37 is placed in the by-pass passage within the piston. The second ball 37 is urged downwardly against the valve seat in the piston by means of a valve spring 38. Thus, should the pressure is the lower portion of the cylinder exceed a predetermined pressure, the check ball 37 will be forced from its seat to allow air to by-pass the piston and be relieved to the atmosphere through the air pipe 31.

The upper edge of the piston 24 is preferably beveled as indicated at 39, to collect lubricating oil adjacent the cylinder walls, where this oil will be in position to be blown downwardly through the by-pass passages 32 when the piston approaches its lower extremity of travel.

The piston is preferably provided with conventional sealing rings 40, and the plunger guide 20 is also provided with a shaft sealing O ring 41. The lower extremity of the plunger 23 is threaded, as indicated at 42, to receive interchangeable bushing heads 43.

In use, the bearing of the connecting rod 19 is rested upon the shoulder 18 of the anvil 17 and air is admitted through the air pipe 31. The air forces the bushing head 43 against the bushing, forcing it downwardly through the bearing of the connecting rod 19 and discharging it through the open bottom of the tubular anvil 17, as indicated in broken line at 44.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A bearing press comprising: a base plate; a top plate supported above and in spaced relation to said base plate; a bearing anvil mounted in said base plate; a plunger guide mounted in said top plate in vertical, axial alignment with said bearing anvil; a plunger extending upwardly through said plunger guide; a bushing-extracting head mounted on the lower extremity of said plunger; a piston mounted on the upper extremity of said plunger; a cylinder secured on said top plate and surrounding said piston in slidable engagement therewith; a cylinder head closing the upper extremity of said cylinder; means for admitting air under pressure to the upper extremity of said cylinder for urging said piston downwardly; means for discharging the air from the upper extremity of said cylinder to the atmosphere; means for automatically relieving the air pressure from the lower extremity of said cylinder to the upper extremity thereof when the pressure in the upper extremity is relieved; spring means in said cylinder acting upwardly against said piston to urge the latter upwardly therein when the air pressure in the upper extremity of said cylinder has been relieved; a return conduit communicating through said top plate with the lower portion of said cylinder and communicating through said cylinder head with the upper portion of said cylinder; and a check valve interposed in said return conduit to prevent air from passing from the upper portion of said cylinder to the lower portion thereof, and allowing air to flow from the lower extremity of said cylinder to the upper extremity thereof when the pressure in the upper extremity is relieved, said return conduit communicating with a vertical passage extending through said top to said cylinder so that lubricating oil entering said cylinder will flow by gravity through said passage to said return conduit to be returned to the upper extremity of said cylinder by air returning through said conduit.

2. A bearing press comprising: a base plate; a top plate supported above and in spaced relation to said base plate; a bearing anvil mounted in said base plate; a plunger guide mounted in said top plate in vertical, axial alignment with said bearing anvil; a plunger extending upwardly through said plunger guide; a bushing-extracting head mounted on the lower extremity of said plunger; a piston mounted on the upper extremity of said plunger; a cylinder secured on said top plate and surrounding said piston in slidable engagement therewith; a cylinder head closing the upper extremity of said cylinder; means for admitting air under pressure to the upper extremity of said cylinder for urging said piston downwardly; means for discharging the air from the upper extremity of said cylinder to the atmosphere; means for automatically relieving the air pressure from the lower extremity of said cylinder to the upper extremity thereof when the pressure in the upper extremity is relieved; spring means in said cylinder acting upwardly against said piston to urge the latter upwardly therein when the air pressure in the upper extremity of said cylinder has been relieved; a return conduit communicating through said top plate with the lower portion of said cylinder and communicating through said cylinder head with the upper portion of said cylinder; a check valve interposed in said return conduit to prevent air from passing from the upper portion of said cylinder to the lower portion thereof, and allowing air to flow from the lower extremity of said cylinder to the upper extremity thereof when the pressure in the upper extremity is relieved and a passage communicating between said return conduit and the top portion of said cylinder so that lubricating oil entering said cylinder will flow by gravity through said passage to said return conduit so as to be returned to the upper extremity of said cylinder by air returning through said conduit.

References Cited in the file of this patent

UNITED STATES PATENTS

| | | |
|---|---|---|
| 883,773 | Ashmore | Apr. 7, 1908 |
| 928,100 | Berry | July 13, 1909 |
| 1,004,000 | Emery | Sept. 26, 1911 |
| 1,050,287 | Olson | Jan. 14, 1913 |
| 1,344,510 | Hilliard | June 22, 1920 |
| 2,283,124 | Peterson et al. | May 12, 1942 |
| 2,482,280 | Lerma | Sept. 20, 1949 |